(12) United States Patent
Howley et al.

(10) Patent No.: US 11,947,971 B2
(45) Date of Patent: Apr. 2, 2024

(54) REMOTE RESOURCE CONFIGURATION MECHANISM

(71) Applicant: Hewlett Packard Enterprise Development LP, Houston, TX (US)

(72) Inventors: Tom Howley, Galway (IE); Mark Rawlings, Galway (IE)

(73) Assignee: Hewlett Packard Enterprise Development LP, Spring, TX (US)

( * ) Notice: Subject to any disclaimer, the term of this patent is extended or adjusted under 35 U.S.C. 154(b) by 177 days.

(21) Appl. No.: 16/898,802

(22) Filed: Jun. 11, 2020

(65) Prior Publication Data

US 2021/0389960 A1 Dec. 16, 2021

(51) Int. Cl.
| | |
|---|---|
| *G06F 9/445* | (2018.01) |
| *G06F 9/50* | (2006.01) |
| *G06F 9/54* | (2006.01) |
| *G06F 11/30* | (2006.01) |
| *H04L 41/0803* | (2022.01) |
| *H04L 41/0806* | (2022.01) |
| *H04L 67/00* | (2022.01) |
| *H04L 67/10* | (2022.01) |

(52) U.S. Cl.
CPC ........ *G06F 9/44505* (2013.01); *G06F 9/5027* (2013.01); *G06F 9/5072* (2013.01); *G06F 9/54* (2013.01); *G06F 11/3006* (2013.01)

(58) Field of Classification Search
CPC .. G06F 9/44505; G06F 9/5027; G06F 9/5072; G06F 9/54; G06F 11/3006
See application file for complete search history.

(56) References Cited

U.S. PATENT DOCUMENTS

| | | | |
|---|---|---|---|
| 8,793,351 B2 | 7/2014 | Renzin | |
| 10,348,574 B2 | 7/2019 | Kulkarni et al. | |
| 10,531,592 B1* | 1/2020 | Jau | G06F 3/0629 |
| 2009/0249213 A1* | 10/2009 | Murase | G06F 3/04817 |
| | | | 715/734 |
| 2013/0013759 A1* | 1/2013 | Austen | H04L 29/08099 |
| | | | 709/223 |
| 2013/0097306 A1* | 4/2013 | Dhunay | H04L 12/6418 |
| | | | 709/224 |
| 2015/0058969 A1* | 2/2015 | Ringdahl | H04L 12/4675 |
| | | | 726/15 |
| 2018/0018195 A1* | 1/2018 | Kim | H04L 41/0895 |
| 2018/0212825 A1* | 7/2018 | Umbehocker | H04L 41/12 |

(Continued)

OTHER PUBLICATIONS

Liquid Inc., "Composable Infrastructure," Dec. 2019, pp. 1-7.

(Continued)

*Primary Examiner* — Jaweed A Abbaszadeh
*Assistant Examiner* — Gayathri Sampath
(74) *Attorney, Agent, or Firm* — Trop, Pruner & Hu, P.C.

(57) ABSTRACT

A system to facilitate configuration of infrastructure resources is described. The system includes a plurality of on-premises infrastructure appliances, each appliance including a plurality of infrastructure devices and an on-premises infrastructure controller to control the plurality of infrastructure devices. The system further includes a cloud services resource configuration manager, communicatively coupled to each of the on-premises infrastructure controllers, to configure each of the on-premises infrastructure appliances via a respective on-premises infrastructure controller.

19 Claims, 4 Drawing Sheets

(56) References Cited

U.S. PATENT DOCUMENTS

| | | | | |
|---|---|---|---|---|
| 2018/0284996 | A1* | 10/2018 | Guim Bernat | G06F 3/0605 |
| 2019/0068523 | A1* | 2/2019 | Chagam Reddy | G06F 11/3409 |
| 2019/0081931 | A1* | 3/2019 | Slutsker | H04W 76/12 |
| 2019/0296958 | A1* | 9/2019 | Cencini | H04L 41/044 |
| 2019/0354454 | A1* | 11/2019 | Shmouely | G06F 11/261 |
| 2020/0250002 | A1* | 8/2020 | Gururaj | G06F 9/5027 |
| 2020/0257566 | A1* | 8/2020 | Ganguli | H05K 7/1489 |
| 2021/0103260 | A1* | 4/2021 | Khurana | G05B 23/0237 |
| 2021/0117181 | A1* | 4/2021 | Bower, III | G06F 12/1081 |

OTHER PUBLICATIONS

Moor Insights & Strategy, "The Journey to Composable Infrastructure," Nov. 2015, pp. 1-11.
Scott D. Lowe and Actualtech Media, "Enabling the Composable Cloud with Cloudistics," 2017, pp. 1-68, ActualTech Media.

* cited by examiner

REMOTE RESOURCE CONFIGURATION MECHANISM

BACKGROUND

A cloud service may refer to a service that includes infrastructure resources (a compute resource, a storage resource, a networking resource, etc.) connected with each other and/or platforms. Such infrastructure resources can collectively be referred to as "cloud resources." A host (also referred to as a cloud service provider) may, as example, provide Software as a Service (SaaS) by hosting applications or other machine-readable instructions; Infrastructure as a Service (IaaS) by hosting equipment (servers, storage components, network components, etc.); or a Platform as a Service (PaaS) by hosting a computing platform (operating system, hardware, storage, and so forth).

A hybrid cloud is a public and/or private cloud environment at which IaaS or PaaS is offered by a cloud service provider. The services of the public cloud may be used to deploy applications. In other examples, a hybrid cloud may also offer SaaS, such as in examples where the public cloud offers the SaaS as a utility (e.g. according to a subscription or pay as you go model).

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Figure 1:
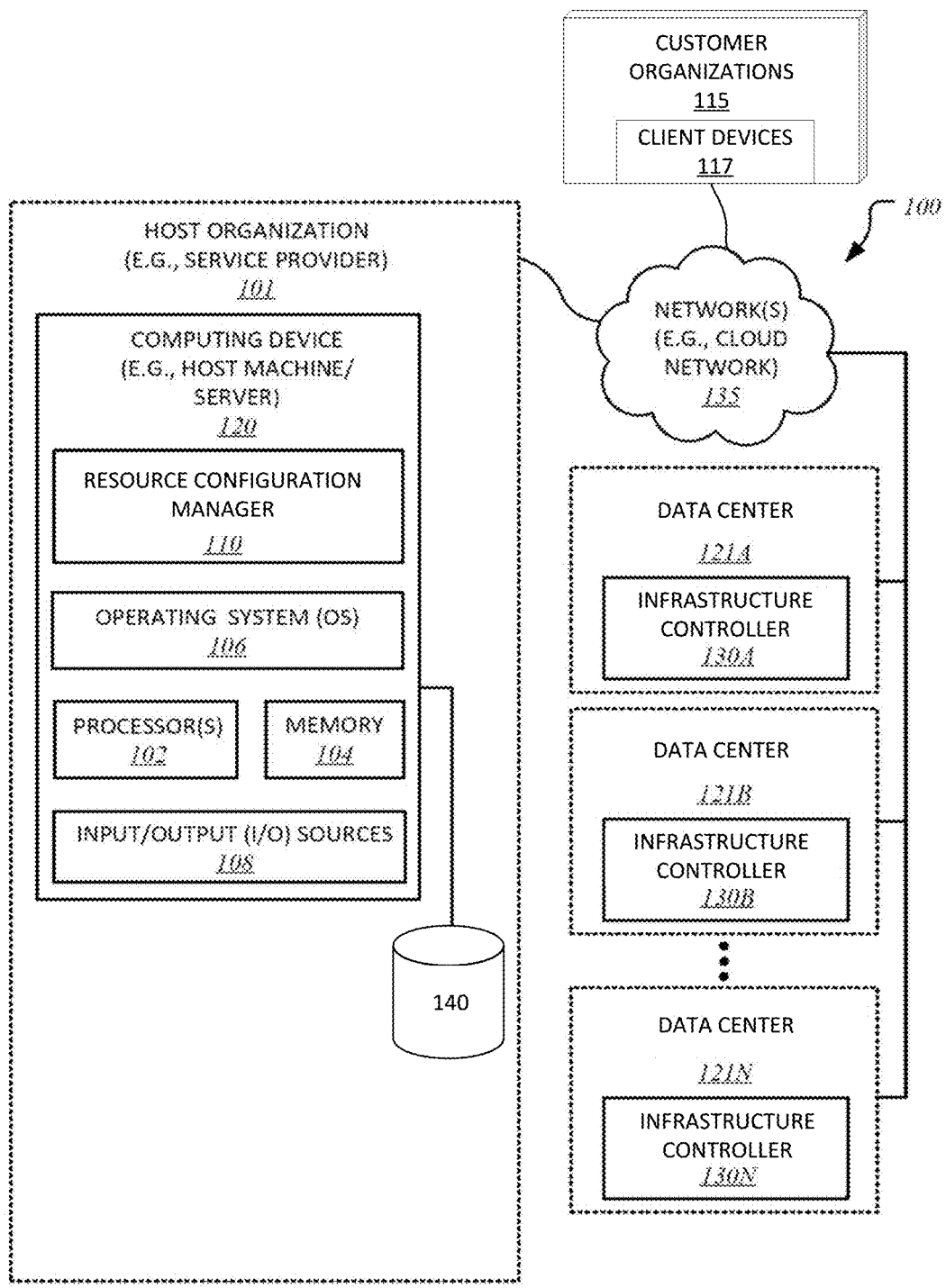
FIG. 1 illustrates one embodiment of an infrastructure management system.

Composable resource infrastructure (or composable infrastructure) encompasses an abstraction of on-premises infrastructure resources (e.g., compute, storage, and networking resources) from physical locations, such as data centers, to provide software management of the resources via a web-based interface. Thus, composable infrastructure is the foundation for private and hybrid cloud solutions by making data center resources readily available as cloud services.

However, a rack of composable infrastructure (e.g., a composable rack) typically needs to be configured (e.g., for both connectivity to a data center and internal configuration of physical resources) via an on-premises software controller physically located at a data center site. Such configurations may include a configuration of one or more of: a set of physical data center network connections (or uplinks); ports on the composable rack to which the uplinks are connected; a level of port aggregation; a level of connection redundancy; configuration of Virtual Local Area Networks (VLANS) on each uplink; configuration of Internet Protocol (IP)-subnet addresses available on each network; and connectivity for a frame/enclosure to a pool of storage disks such that some frames may have access to the pool and others do not. Such configurations typically occur after a composable rack has been physically cabled and powered on. The problem, however, is that an operator must physically visit a data center site to implement the above-described rack configurations in order to initialize a rack based on user requirements. This manual process is both time consuming, prone to human error and costly.

In embodiments, a remote resource configuration mechanism is provided that enables remote configuration of a plurality of on-premise composable racks via a SaaS application. In such embodiments, the plurality of composable racks may be physically located in data centers around the world. In further embodiments, the SaaS application may remotely provide updates to a composable rack configuration (e.g. when frames/enclosures are added/enabled). Thus, all that needs to be provided at a physical site is a configuration of a secured and encrypted network path from the SaaS to an on-premises infrastructure controller.

In the following description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

FIG. 1 illustrates one embodiment of an infrastructure management system 100 having a computing device 120 employing a resource configuration manager (or configuration manager) 110. In one embodiment, configuration manager 110 is a remote configuration service hosted within a SaaS that is provided to manage the configuration and update each of a plurality of on-premise infrastructure resource appliances (e.g., racks) located in different data centers. In a further embodiment, configuration manager 110 enables the configuration of infrastructure resources within the appliances on behalf of a plurality of client (or customer) organizations.

As shown in FIG. 1, computing device 120 includes a host server computer serving as a host machine for employing configuration manager 110, which provides a platform to configure infrastructure resources. Computing device 120 may include (without limitation) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 117, etc. Computing device 120 further includes processor(s) 102, memory 104, input/output ("I/O") sources 108, such as touchscreens, touch panels, touch pads, virtual or regular keyboards, virtual or regular mice, etc. In one embodiment, configuration manager 110 may be executed by a separate processor application specific integrated circuit (ASIC) than processor 102. In a further embodiment, configuration manager 110 may act out of band, and may be on a separate power rail, from processor 102. Thus, configuration manager 110 may operate on occasions in which processor 102 is powered down.

In one embodiment, host organization 101 may further employ a production environment that is communicably interfaced with client devices 117 at customer organizations 115 through host organization 101. Client devices 117 may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated database(s) 140 store (without limitation) information and underlying database records having customer and user data therein on to process data on behalf of customer organizations 115. In some embodiments, host organization 101 receives input and other requests from a plurality of customer organizations 115 over one or more networks 135; for example, incoming data, or other inputs may be received from customer organizations 115 to be processed using database system 140.

In one embodiment, each customer organization 115 is an entity selected from a group consisting of a separate and distinct remote organization, an organizational group within host organization 101, a business partner of host organization 101, a customer organization 115 that subscribes to cloud computing services provided by host organization 101, etc.

In one embodiment, requests are received at, or submitted to, a web server within host organization 101. Host organization 101 may receive a variety of requests for processing by host organization 101. For example, incoming requests received at the web server may specify services from host organization 101 are to be provided. Further, host organization 101 may implement a request interface via the web server or as a stand-alone interface to receive requests packets or other requests from the client devices 117. The request interface may further support the return of response packets or other replies and responses in an outgoing direction from host organization 101 to one or more client devices 117.

In one embodiment, computing device 120 may include a server computer that may be further in communication with one or more databases or storage repositories, such as database(s) 140, which may be located locally or remotely over one or more networks, such as network(s) 135 (e.g., cloud network, Internet, proximity network, intranet, Internet of Things ("IoT"), Cloud of Things ("CoT"), etc.). Computing device 120 is further shown to be in communication with any number and type of other computing devices, such as client computing devices 117, over one or more networks, such as network(s) 135.

In one embodiment, host organization 101 provides services to configure resources within data centers 121A-121N. Data centers 121A-121N represent separate infrastructure resource providers that offer services to provide hardware resources (e.g., compute, storage, network elements, etc.) or software resources. In a further embodiment, one or more of providers 121A-121N may provide a virtualization of its resources as a virtualization infrastructure for virtualization of its resources. In this embodiment, computing device 120 resources and/or one or more of the physical infrastructure resources provided by providers 121A-121N may be configured as one or more Point of Developments (PODs) (or instance machines), where an instance machine (or instance) comprises a cluster of infrastructure (e.g., compute, storage, software, networking equipment, etc.) that operate collectively.

According to one embodiment, each of the providers data centers 121A-121N implement one or more on-premise infrastructure controller 130 to control its respective resources. In this embodiment, each infrastructure controller 130 controls an on-premise infrastructure appliance, which provides access to infrastructure devices within the appliance, or to one or more infrastructure elements (e.g., an instance of managed infrastructure) of its respective infrastructure resources. In one embodiment, each infrastructure controller 130 comprises a software-defined networking (SDN) controller that provide on-premises infrastructure management of physical infrastructure resources, such as a OneView® Infrastructure Management System. However other embodiments may implement different infrastructure management systems.

Figure 2:
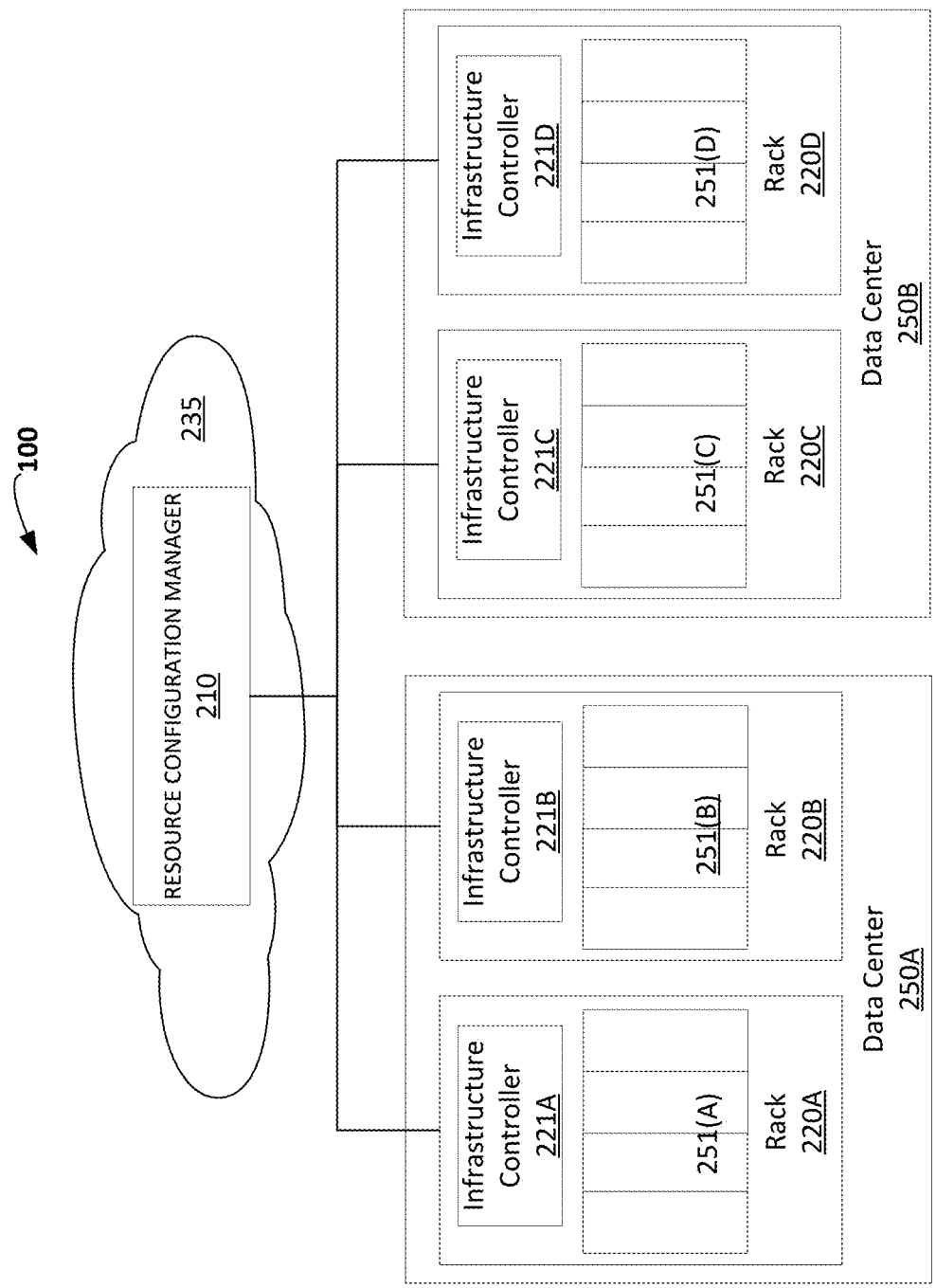
FIG. 2 is a block diagram illustrating another embodiment of an infrastructure management system.

FIG. 2 is a block diagram illustrating another embodiment of an infrastructure management system 100. As shown in FIG. 2, infrastructure management system 100 may include the management of resources within data centers. For example, infrastructure management system 100 includes a data center 250A having rack 220A and rack 220B. Each rack includes an infrastructure controller 221 and resources 251. In one embodiment, each infrastructure controller 221 manages its respective resources 251. According to one embodiment, configuration manager 210 is communicatively coupled to each infrastructure controller 221. For example, configuration manager 210 is a cloud service (e.g., as discussed in FIG. 1) that configures all of the resources within each data center 250 (e.g., data center 250A and 250B) via infrastructure controllers 221A-221D.

Figure 3:
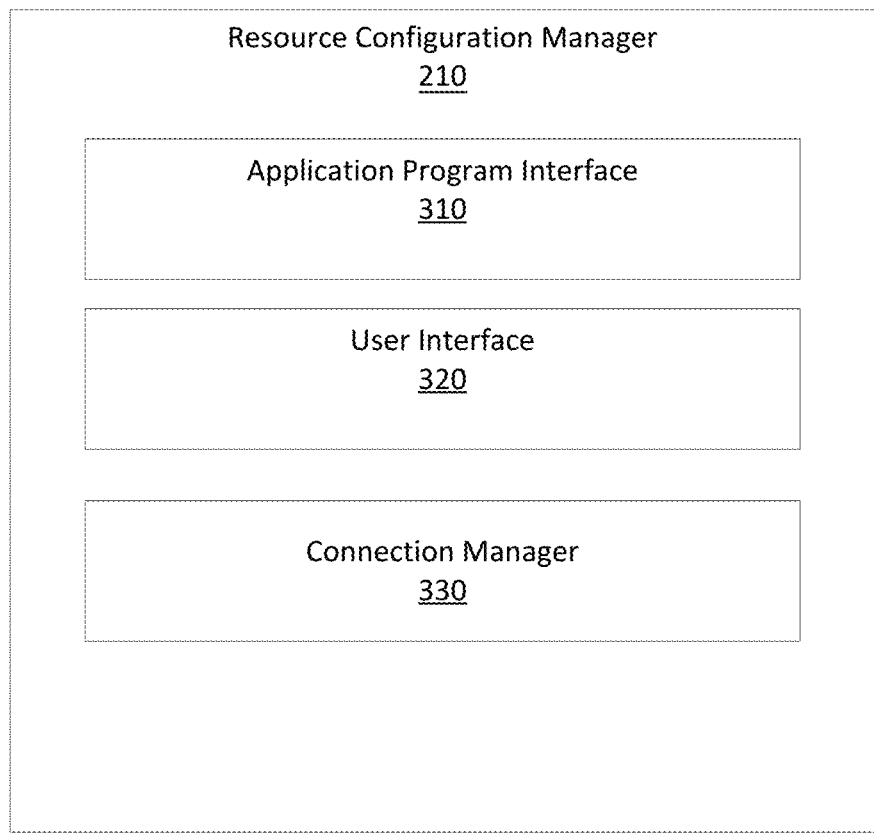
FIG. 3 is a block diagram illustrating one embodiment of an configuration manager.

FIG. 3 illustrates one embodiment of a configuration manager 210. As shown in FIG. 3, configuration manager 210 includes an application program interface (API) 210, user interface 320 and connection manager 330. According to one embodiment, API 210 comprises a Representational state transfer (REST) interface that facilitates communication with infrastructure controllers 221 via an interconnected network, such as the Internet. In a further embodiment, API 210 is communicatively coupled to each infrastructure controller 221 via a secure tunneling protocol to enable private network communications via the network.

Prior to communication with an infrastructure controller 221, appliances within data center 250 are physically connected to one or more networks within the data center 250 and powered on. Additionally, the infrastructure controller 221 managing the appliances is started up. According to one embodiment, a data center user (e.g., at a client device 117) may log in to configuration manager 210 via user interface 320 and select a data center 250 to access. Subsequently, the user may implement user interface 320 to request access to an infrastructure controller 221 at the data center 250. In such an embodiment, the request may include an address and user credentials associated with a particular infrastructure controller 221. API 310 receives the address and credentials and uses the information to establish a connection with the infrastructure controller 221 via a pre-existing secure tunnel.

In a further embodiment, user interface 320 prompts the user with one or more configuration questions regarding various appliance configuration parameters that are to be requested to configure the appliance. In such an embodiment, configuration parameters may include information related to a set of uplinks and aggregation/redundancy configuration, VLAN, IP addresses, storage configuration, etc. Upon receiving the configuration parameters as a configuration request (e.g., via answers to the questions), a request is made to connection manager 330 to configure the appliance according to the configuration parameters. In one embodiment, connection manager 330 is a controller API that is configured to control the infrastructure controllers 221.

In response, connection manager 330 performs a discovery of the appliance inventory (e.g., available infrastructure resources) to determine whether the requested configuration is compatible with the infrastructure resources available at the appliance. In one embodiment, an infrastructure controller 221 provides an API that allows the configuration manager 210 to remotely interrogate and determine a physical makeup of an appliance (e.g., a number of enclosure/frames, number of hardware servers (computes) per enclosure/frame, number of disk enclosures (capacity information), networking information (number of uplinks, number of interconnects with compute resources), etc.). In another embodiment, configuration manager 210 may perform an initial interrogation and discovery prior to prompting the user for configuration parameters. Upon a determination that the requested configuration is compatible, connection manager 330 facilitates application of the requested configuration at the appliance via the associated infrastructure controller 221 (e.g., via the infrastructure controller 221 API).

In one embodiment, the configuration includes the configuration of uplinks, the assignment of uplinks to frames/enclosures and configuration of connectivity between frames/enclosures and the storage array. Subsequently, the appliance is ready to apply infrastructure workloads. Upon a determination that the requested configuration is not compatible, user interface 320 transmits a message to the user indicating that the configuration request is not compatible with the infrastructure resources available at the appliance. In one embodiment, the user is again prompted with the configuration questions regarding various appliance configuration parameters.

Figure 4:
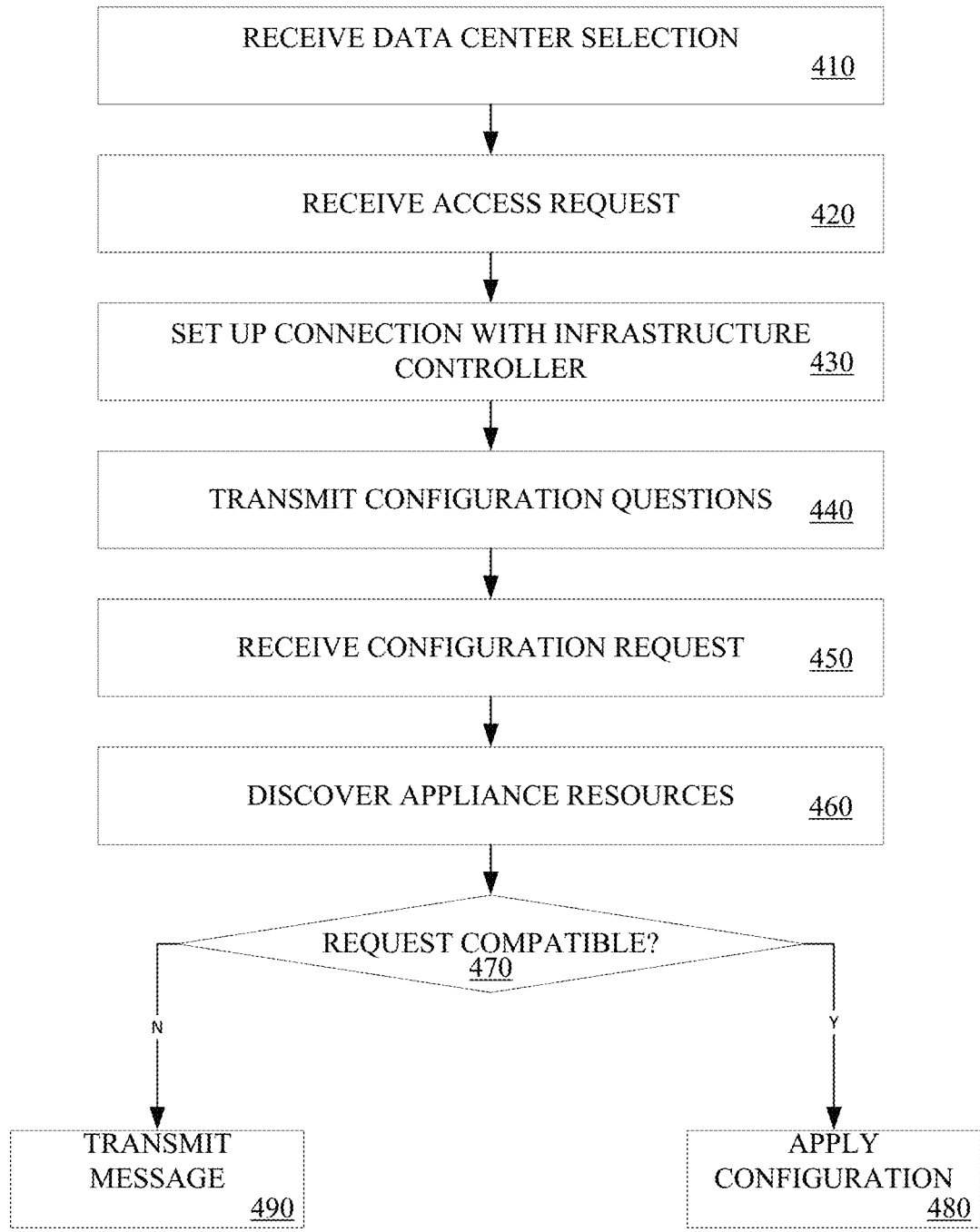
FIG. 4 is a flow diagram illustrating one embodiment of a remote configuration process.

FIG. 4 is a flow diagram illustrating one embodiment of a process to remotely configure an infrastructure controller 221. At processing block 410, a data center selection is received at the configuration manager (e.g., via a user interface). Subsequently, a request to access an infrastructure controller 221 is received, processing block 420. As discussed above, the request may include address and user credentials associated with an infrastructure controller at the data center. At processing block 430, the credentials are used to set up a connection between the configuration manager and the infrastructure controller. As discussed above, the connection is set up via a pre-existing secure tunnel. At processing block 440, configuration questions are transmitted to the user. As previously mentioned, the configuration questions include questions regarding various appliance configuration parameters (e.g., information related to a set of uplinks and aggregation/redundancy configuration, VLAN, IP addresses, storage configuration, etc.) that are to be implemented to configure the appliance.

At processing block 450, a configuration request including the configuration parameters is received in response to the configuration questions. At processing block 460, a discovery of the available infrastructure resources is performed to determine whether the requested configuration is compatible with the infrastructure resources available at the appliance. At decision block 470, a determination is made as to whether the requested configuration is compatible with the infrastructure resources available. The requested configuration is applied at the appliance upon a determination that the requested configuration is compatible, processing block 480. As a result, the appliance is ready to apply infrastructure workloads. Otherwise, a message is transmitted to the user indicating that the configuration request is not compatible with the available infrastructure resources upon a determination that the requested configuration is not compatible, processing block 490.

The above-described process may also be implemented to remotely re-configure an appliance. For example, a rack configuration may be updated (e.g., when frames and/or enclosures are added/enabled). Thus, implementation of the configuration manager results in lower costs due to a reduced number of visits to customer sites.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A system comprising:
a plurality of on-premises racks comprising respective infrastructure controllers, each of the plurality of on-premises racks comprising a collection of composable infrastructure resources managed by a respective infrastructure controller of the infrastructure controllers,
a cloud services resource configuration manager communicatively coupled to the infrastructure controllers, the cloud services resource configuration manager to:
receive, at the cloud services resource configuration manager from a client device, a request to access a first infrastructure controller of the infrastructure controllers, the request comprising an address associated with the first infrastructure controller,
establish, using the address in the request, a connection between the cloud services resource configuration manager and the first infrastructure controller,
generate a configuration request comprising configuration information related to an assignment of uplinks to frames or enclosures of a first on-premises rack comprising the first infrastructure controller to which the cloud services resource configuration manager has established the connection, wherein the assignment of uplinks includes a configuration of connectivity between the frames or enclosures and a storage array,
determine whether a requested configuration based on the configuration information is compatible with the collection of composable infrastructure resources of the first on-premises rack, and
based on determining that the requested configuration is compatible with the collection of composable infrastructure resources of the first on-premises rack, configure the collection of composable infrastructure resources of the first on-premises rack according to the configuration information.

2. The system of claim 1, wherein the request to access the first infrastructure controller further comprises a credential, and wherein the cloud services resource configuration manager is to establish the connection with the first infrastructure controller using the credential.

3. The system of claim 1, wherein the configuring of the collection of composable infrastructure resources comprises configuring virtual local area networks on the uplinks.

4. The system of claim 1, wherein the cloud services resource configuration manager comprises an application program interface to facilitate communication with the plurality of on-premises racks.

5. The system of claim 1, wherein the cloud services resource configuration manager is to:
cause presentation of a user interface, and
determine the configuration information to include in the configuration request based on information obtained from the user interface.

6. The system of claim 5, wherein the cloud services resource configuration manager is to:
cause the user interface to prompt a user with one or more configuration questions,
wherein the information obtained from the user interface is based on configuration parameters provided by the user in response to the one or more configuration questions in the user interface.

7. The system of claim 6, wherein the cloud services resource configuration manager is to receive a login of the user at the user interface.

8. The system of claim 1, wherein the cloud services resource configuration manager is to access an application programming interface of the first infrastructure controller to discover an inventory of the collection of composable infrastructure resources of the first on-premises rack.

9. The system of claim 1, wherein the configuration information of the configuration request comprises configuration parameters including one or more of virtual local area network (VLAN) information, Internet Protocol (IP) addresses, or storage configurations.

10. A non-transitory machine-readable medium storing instructions of a configuration manager, the instructions when executed causing one or more processors to:
receive, at the configuration manager, a request from a client computing device via a network to access a first infrastructure controller of a plurality of infrastructure controllers, the plurality of infrastructure controllers being part of respective on-premises racks, wherein the request comprises an address associated with the first infrastructure controller, and each of the on-premises racks comprises a collection of composable infrastructure resources managed by a respective infrastructure controller of the plurality of infrastructure controllers;
establish, using the address in the request, a connection between the configuration manager and the first infrastructure controller;
generate a configuration request comprising configuration information related to an assignment of uplinks to frames or enclosures of a first on-premises rack comprising the first infrastructure controller to which the configuration manager has established the connection, wherein the assignment of uplinks includes a configuration of connectivity between the frames or enclosures and a storage array;
determine whether a requested configuration based on the configuration information is compatible with the collection of composable infrastructure resources of the first on-premises rack; and
based on determining that the requested configuration is compatible with the collection of composable infrastructure resources of the first on-premises rack, configure the collections of composable infrastructure resources of the first on-premises rack according to the configuration information.

11. The non-transitory machine-readable medium of claim 10, wherein the request to access the first infrastructure controller further comprises a credential, and wherein the instructions when executed cause the one or more processors to establish the connection between the configuration manager and the first infrastructure controller using the credential.

12. The non-transitory machine-readable medium of claim 10, wherein the configuration information in the configuration request comprises configuration parameters including one or more of virtual local area network (VLAN) information, Internet Protocol (IP) addresses, or storage configurations.

13. The non-transitory machine-readable medium of claim 10, wherein the instructions when executed cause the one or more processors to:
cause presentation of a user interface by the configuration manager; and
determine the configuration information to include in the configuration request based on information obtained from the user interface.

14. The non-transitory machine-readable medium of claim 13, wherein the instructions when executed cause the one or more processors to:
cause the user interface to prompt a user with one or more configuration questions, wherein the information obtained from the user interface at the configuration manager is based on configuration parameters provided by the user in response to the one or more configuration questions in the user interface.

15. The non-transitory machine-readable medium of claim 14, wherein the instructions when executed cause the one or more processors to:
receive a login, at the user interface, by the user to the configuration manager.

16. A method to facilitate infrastructure management, comprising:
receiving, at a configuration manager in a computer system, a request from a client computing device via a network to access a first infrastructure controller of a plurality of infrastructure controllers, the plurality of infrastructure controllers being part of respective on-premises racks, wherein the request comprises an address associated with the first infrastructure controller, and each of the on-premises racks comprises a collection of composable infrastructure resources managed by a respective infrastructure controller of the plurality of infrastructure controllers;
establishing, by the configuration manager using the address in the request, a connection between the configuration manager and the first infrastructure controller;
generating, by the configuration manager, a configuration request comprising configuration information related to an assignment of uplinks to frames or enclosures of a first on-premises rack comprising the first infrastructure controller to which the configuration manager has established the connection, wherein the assignment of uplinks includes a configuration of connectivity between the frames or enclosures and a storage array;
determining, by the configuration manager, whether a requested configuration based on the configuration information is compatible with the collection of composable infrastructure resources of the first on-premises rack; and
based on determining that the requested configuration is compatible with the collection of composable infrastructure resources of the first on-premises rack, configuring, by the configuration manager, the collection of composable infrastructure resources of the first on-premises rack according to the configuration information.

17. The method of claim 16, wherein the request to access the first infrastructure controller further comprises a credential, and wherein the method further comprises:
establishing, by the configuration manager, the connection with the first infrastructure controller using the credential.

18. The method of claim 16, wherein the configuration information of the configuration request comprises configuration parameters including virtual local area network (VLAN) information and storage configurations.

19. The method of claim 16, further comprising:
causing, by the configuration manager, presentation of a user interface; and
determining, by the configuration manager, the configuration information to include in the configuration request based on information obtained from the user interface.

* * * * *